US009907006B2

(12) United States Patent
Walley et al.

(10) Patent No.: US 9,907,006 B2
(45) Date of Patent: Feb. 27, 2018

(54) CROSS RADIO ACCESS TECHNOLOGY ACCESS WITH HANDOFF AND INTERFERENCE MANAGEMENT USING COMMUNICATION PERFORMANCE DATA

(71) Applicant: Avago Technologies General IP (Singapore) Pte. Ltd., Irvine, CA (US)

(72) Inventors: John Walley, Ladera Ranch, CA (US); Wael Diab, San Francisco, CA (US); Rafael Carmon, Rishon Lezion (IL); Raymond Hayes, Los Gatos, CA (US); Kamlesh Rath, San Ramon, CA (US); Sindhu Verma, Bangalore (IN); Soumen Chakraborty, Bangalore (IN); Pavan Nuggehalli, Mountain View, CA (US); Shao-Cheng Wang, Santa Clara, CA (US); Nicholas Ilyadis, Merrimack, NH (US); Murat Mese, Rancho Palos Verdes, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 8 days.

(21) Appl. No.: 14/295,285

(22) Filed: Jun. 3, 2014

(65) Prior Publication Data
US 2014/0355566 A1 Dec. 4, 2014

Related U.S. Application Data

(60) Provisional application No. 61/830,567, filed on Jun. 3, 2013, provisional application No. 61/847,855, filed (Continued)

(51) Int. Cl.
*H04W 36/24* (2009.01)
(52) U.S. Cl.
CPC ................. *H04W 36/245* (2013.01)

(58) Field of Classification Search
CPC ..... H04W 16/14; H04W 24/02; H04W 24/10; H04W 28/08; H04W 36/00; (Continued)

(56) References Cited

U.S. PATENT DOCUMENTS 6,456,862 B2  9/2002  Benni
6,577,868 B1  6/2003  Vialen et al.
(Continued)

FOREIGN PATENT DOCUMENTS

CN    102355694    2/2012
CN    102595509    7/2012
(Continued)

OTHER PUBLICATIONS

Non-Final Office Action for U.S. Appl. No. 14/295,011, dated Sep. 30, 2015; 15 pages.
(Continued)

*Primary Examiner* — Eric Nowlin
(74) *Attorney, Agent, or Firm* — Sterne, Kessler, Goldstein & Fox P.L.L.C.

(57) ABSTRACT

Systems and methods for adaptive access and handover configuration based on historical data are provided. Access and handover decisions are optimized in a multiple radio access technology environment using historical data associated with network performance. Future needs for access and handovers are predicted using historical data associated with the user and historical data associated with network performance. Performance metrics are received periodically or continuously from nodes in one or more networks at a centralized controller. The centralized multi RAT controller correlates these performance metrics and determines predicted handovers for a user device. Preparations for the predicted handovers can then be made prior to the handover event.

20 Claims, 8 Drawing Sheets

Related U.S. Application Data on Jul. 18, 2013, provisional application No. 61/892,378, filed on Oct. 17, 2013.

(58) Field of Classification Search
CPC ......... H04W 36/0016; H04W 36/0022; H04W 36/0066; H04W 36/0083; H04W 36/0088; H04W 36/08; H04W 36/14; H04W 36/24; H04W 36/245; H04W 36/30; H04W 36/32; H04W 40/36; H04W 48/16; H04W 48/18; H04W 72/1215; H04W 76/026; H04W 88/06; H04W 88/10; H04W 88/12; H04W 24/08; H04W 28/0226; H04W 28/16; H04W 28/18; H04W 28/24; H04W 36/0011; H04W 36/0044; H04W 36/0061; H04W 36/0094; H04W 36/02; H04W 36/18; H04W 36/26; H04W 36/34; H04W 36/36; H04W 48/20; H04W 72/0413; H04W 72/06; H04W 72/08; H04W 76/041; H04B 17/318; H04B 17/38; H04L 29/06523; H04L 43/0829; H04L 43/087; H04L 43/0888; H04L 43/0894; H04L 61/3075
See application file for complete search history.

(56) References Cited

U.S. PATENT DOCUMENTS

| | | | |
|---|---|---|---|
| 7,072,701 B2 | 7/2006 | Chen et al. | |
| 7,318,111 B2* | 1/2008 | Zhao | H04W 8/183 709/223 |
| 7,433,929 B2* | 10/2008 | Guilford | H04W 48/18 455/435.2 |
| 7,817,964 B2* | 10/2010 | Patel | H04W 24/10 370/328 |
| 7,848,756 B2* | 12/2010 | Nader | H04J 11/0093 370/331 |
| 8,000,276 B2* | 8/2011 | Scherzer | H04W 72/02 370/310.1 |
| 8,379,551 B2* | 2/2013 | Wietfeldt | H04W 88/06 370/310 |
| 8,396,472 B2 | 3/2013 | Worrall et al. | |
| 8,396,526 B2 | 3/2013 | Benni | |
| 8,428,674 B2 | 4/2013 | Duffy et al. | |
| 8,514,778 B1* | 8/2013 | Fang | H04W 4/06 370/328 |
| 8,526,375 B2* | 9/2013 | Ishizu | H04L 12/5692 370/329 |
| 8,566,455 B1 | 10/2013 | Zhao et al. | |
| 8,811,187 B2* | 8/2014 | Macias | H04W 48/18 370/241 |
| 8,849,276 B2* | 9/2014 | Guilford | H04W 28/08 370/331 |
| 9,049,613 B2* | 6/2015 | Agarwal | H04W 28/0236 |
| 9,516,665 B2* | 12/2016 | Jain | H04W 48/18 |
| 2003/0119508 A1* | 6/2003 | Gwon | H04W 36/30 455/436 |
| 2003/0210666 A1* | 11/2003 | Trossen | H04L 63/164 370/331 |
| 2004/0066759 A1* | 4/2004 | Molteni | H04L 41/048 370/329 |
| 2004/0198360 A1* | 10/2004 | Kotzin | H04W 48/18 455/445 |
| 2006/0025149 A1 | 2/2006 | Karaogus et al. | |
| 2006/0098614 A1* | 5/2006 | Moon | H04L 29/12367 370/338 |
| 2006/0129630 A1 | 6/2006 | Catalina-Gallego et al. | |
| 2006/0166677 A1 | 7/2006 | Derakshan et al. | |
| 2006/0193295 A1 | 8/2006 | White et al. | |
| 2006/0223575 A1* | 10/2006 | Su | H04W 48/16 455/552.1 |
| 2007/0026811 A1* | 2/2007 | Blume | H04W 48/18 455/67.11 |
| 2007/0115899 A1* | 5/2007 | Ovadia | H04W 36/24 370/338 |
| 2007/0133472 A1* | 6/2007 | Kim | H04W 36/30 370/332 |
| 2008/0014957 A1* | 1/2008 | Ore | H04W 36/0088 455/452.1 |
| 2008/0085711 A1 | 4/2008 | Alberi-Morel et al. | |
| 2008/0096560 A1* | 4/2008 | Felske | H04W 36/0083 455/436 |
| 2008/0101292 A1* | 5/2008 | Sengupta | H04W 36/24 370/331 |
| 2008/0102815 A1* | 5/2008 | Sengupta | H04W 36/24 455/424 |
| 2008/0242301 A1 | 10/2008 | Osterling et al. | |
| 2008/0244095 A1* | 10/2008 | Vos | H04L 12/5692 709/250 |
| 2009/0016299 A1 | 1/2009 | Watanabe et al. | |
| 2009/0175239 A1* | 7/2009 | Grinshpun | H04W 36/0011 370/331 |
| 2009/0281403 A1 | 11/2009 | Benni | |
| 2010/0062800 A1 | 3/2010 | Gupta et al. | |
| 2010/0075665 A1* | 3/2010 | Nader | H04J 11/0093 455/426.1 |
| 2010/0087195 A1* | 4/2010 | Lu | H04W 36/30 455/436 |
| 2010/0099393 A1* | 4/2010 | Brisebois | H04M 15/00 455/418 |
| 2010/0202322 A1 | 8/2010 | Cai et al. | |
| 2010/0240370 A1* | 9/2010 | Pandit | H04W 36/385 455/436 |
| 2010/0246532 A1* | 9/2010 | Olvera-Hernandez | H04W 36/005 370/331 |
| 2011/0096754 A1 | 4/2011 | Harris et al. | |
| 2011/0110229 A1 | 5/2011 | Himayat et al. | |
| 2011/0182272 A1* | 7/2011 | Santhanam | H04W 36/14 370/332 |
| 2011/0310850 A1* | 12/2011 | Klingenbrunn | H04W 36/30 370/332 |
| 2011/0310851 A1* | 12/2011 | Klingenbrunn | H04W 76/041 370/332 |
| 2012/0028638 A1 | 2/2012 | Mueck et al. | |
| 2012/0071739 A1 | 3/2012 | Chen et al. | |
| 2012/0163301 A1* | 6/2012 | Jang | H04W 48/18 370/328 |
| 2012/0182874 A1* | 7/2012 | Siomina | H04W 56/004 370/241 |
| 2012/0188873 A1 | 7/2012 | Nakatsugawa et al. | |
| 2012/0188949 A1 | 7/2012 | Salkintzis et al. | |
| 2013/0023274 A1* | 1/2013 | Meredith | H04W 48/18 455/450 |
| 2013/0023281 A1* | 1/2013 | Meredith | H04W 36/245 455/456.1 |
| 2013/0065632 A1* | 3/2013 | Macias | H04W 36/0083 455/525 |
| 2013/0268628 A1 | 10/2013 | Zhu et al. | |
| 2014/0003404 A1* | 1/2014 | Gillett | H04W 48/18 370/338 |
| 2014/0011499 A1* | 1/2014 | He | H04W 36/32 455/436 |
| 2014/0051458 A1* | 2/2014 | Khosla | H04W 4/02 455/456.1 |
| 2014/0066117 A1* | 3/2014 | Egner | H04W 4/003 455/513 |
| 2014/0071895 A1* | 3/2014 | Bane | H04L 69/321 370/328 |
| 2014/0079007 A1 | 3/2014 | Li et al. | |
| 2014/0162648 A1* | 6/2014 | Cui | H04W 48/18 455/435.3 |
| 2014/0171761 A1 | 6/2014 | Dalene et al. | |
| 2014/0199980 A1 | 7/2014 | Rao et al. | |
| 2014/0220967 A1* | 8/2014 | Pankajakshan | H04W 48/18 455/432.1 |
| 2014/0256326 A1 | 9/2014 | Morgan et al. | |
| 2014/0355501 A1 | 12/2014 | Carmon et al. | |
| 2014/0355522 A1 | 12/2014 | Diab et al. | |

(56) References Cited

U.S. PATENT DOCUMENTS

| | | | |
|---|---|---|---|
| 2014/0355565 A1 | 12/2014 | Hayes et al. | |
| 2014/0357224 A1 | 12/2014 | Walley et al. | |
| 2014/0378141 A1 | 12/2014 | Walley et al. | |
| 2015/0003420 A1* | 1/2015 | Vangala | H04W 36/22 370/333 |
| 2015/0036672 A1* | 2/2015 | Kim | H04W 48/18 370/338 |
| 2015/0304812 A1* | 10/2015 | Khosla | H04W 4/02 455/456.1 |
| 2016/0066151 A1* | 3/2016 | Palanki | H04L 67/10 455/456.1 |
| 2017/0070919 A1* | 3/2017 | Verger | H04W 76/02 |

FOREIGN PATENT DOCUMENTS

| | | |
|---|---|---|
| CN | 102711184 | 10/2012 |
| DE | 102004049705 | 4/2006 |
| EP | 2685771 | 1/2014 |
| WO | WO 2012/163260 | 12/2012 |
| WO | WO 2013/126859 | 8/2013 |
| WO | WO 2013/181191 | 12/2013 |
| WO | WO 2015073753 A1 * | 5/2015 ............ H04W 24/08 |

OTHER PUBLICATIONS

Non-Final Office Action for U.S. Appl. No. 14/295,282, dated Jan. 29, 2016; 16 pages.

Non-Final Office Action for U.S. Appl. No. 14/295,284, dated Dec. 10, 2015; 21 pages.

Non-Final Office Action for U.S. Appl. No. 14/295,291, dated Dec. 15, 2015; 24 pages.

European Search Report and Opinion directed to related European Patent Application No. 15 16 1588, completed Sep. 1, 2015; 6 pages.

* cited by examiner

483

| | path A | | | | path B | | |
|---|---|---|---|---|---|---|---|
| | node 1 | node 2 | node 3 | node n | node 1 | node 4 | node x |
| application 1 | metrics | metrics | metrics | metrics | metrics | metrics | metrics |
| application 2 | metrics | metrics | metrics | metrics | metrics | metrics | metrics |
| ... | | | | | | | |
| application x | metrics | metrics | metrics | metrics | metrics | metrics | metrics |

NETWORK 1

NETWORK 2

NETWORK N

FIG. 4 ary performance met-
CROSS RADIO ACCESS TECHNOLOGY ACCESS WITH HANDOFF AND INTERFERENCE MANAGEMENT USING COMMUNICATION PERFORMANCE DATA

CROSS REFERENCE TO RELATED APPLICATIONS

This application claims the benefit of U.S. Provisional Patent Application No. 61/830,567, filed Jun. 3, 2013, U.S. Provisional Patent Application No. 61/847,855, filed Jul. 17, 2013, and U.S. Provisional Patent Application No. 61/892,378, filed Oct. 17, 2013, each of which is incorporated by reference herein in its entirety.

FIELD OF THE INVENTION

This application relates generally to wireless networks and, more specifically, to handovers between networks using different radio access technologies.

BACKGROUND

Wireless technologies have become an integral part of communications used by individuals. Traditional cellular networks have evolved to provide both voice and data services to users. In addition, networks such as wireless LANs (e.g., 802.11) and WiMAX (e.g., 802.16e) networks have emerged to provide wireless connectivity to data networks such as the internet. Because of the increased availability of multiple types of wireless networks, user devices have been developed to work on multiple types of wireless networks.

These user devices supporting multiple networks typically do not operate on two different networks simultaneously. As a result, the device is required to select a network for communications. Cellular networks (e.g., 3G, 4G, LTE networks) typically have larger coverage areas than wireless data networks (e.g., 820.11). Therefore, in some areas, a user may only be able to access and utilize voice and data services through a cellular network. However, when a user enters an area covered by a cellular network and a wireless data network (e.g., 802.11), the device must select a network for communications. For certain types of traffic such as data it may be beneficial to hand over the communication from a cellular network to the data network.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 4 depicts an exemplary pathway performance metrics profile for one or more applications, according to embodiments of the present disclosure.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Systems and methods for adaptive access and handover configuration based on historical data are provided. In an embodiment, access and handover decisions are optimized in a multiple radio access technology environment using historical data associated with network performance. In another embodiment, future needs for access and handovers are predicted using historical data associated with the user and historical data associated with network performance. Preparations for the predicted handovers can then be made prior to the handover event.

Figure 1:
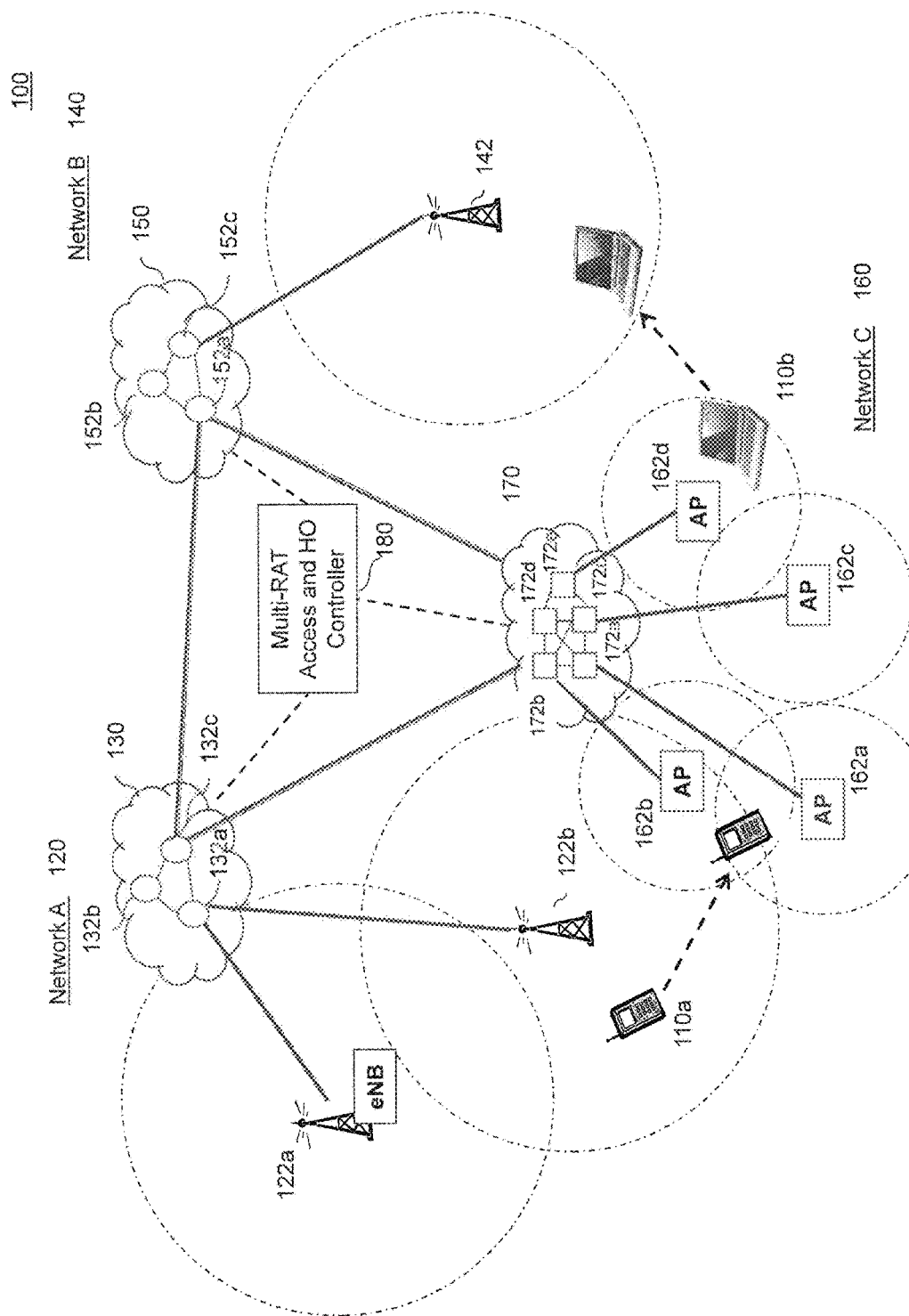
FIG. 1 illustrates an exemplary operating environment for optimizing handover and/or predicting the need for a handover, according to embodiments of the present disclosure.

FIG. 1 depicts an exemplary operating environment 100 for optimizing handovers and/or predicting the need for a future handover in a multi-RAT environment, according to embodiments of the present invention. Operating environment 100 includes multiple types of wireless networks— network A 120, network B 140, and network C 160. Each network utilizes a different radio access technology (RAT) for communication between a device and the network access component (e.g., base station, evolved NodeB (eNB) or access point) over the air interface. A RAT is typically directed to certain types of traffic. For example, CDMA, FDMA, OFDMA, GSM are directed to voice traffic and 802.11 and 802.16(e) are directed to data traffic.

Network A 120 may be a cellular network such as a third generation (3G), fourth generation (4G), or LTE network. The RAT utilized by Network A may be, for example, CDMA, W-CDMA, CDMA2000, FDMA, OFDMA or similar. Network A includes multiple base stations 122 (or eNBs) and a core network 130. Core network 130 includes multiple switching or routing elements 132. In embodiments, core network 130 is a public switched telephone network (PSTN).

Network B 140 may be a cellular network utilizing a different RAT than Network A or may be a broadband wireless network such as a network utilizing 802.16 (Wi-MAX). Network B includes multiple base stations 142 and a core network 150. Core network 150 includes multiple switching or routing elements 152.

Network C 160 may be a wireless data network such as a wireless local area network (LAN) based on IEEE 802.11. Network C includes multiple access points (APs) 162 and a core network 170. Core network 170 includes multiple routers 172. In embodiments, core network 170 is a public data network such as the Internet, a private data network, or a combination thereof.

Operating environment 100 includes multiple user devices 110. A user device 110 may be any wireless device such as a mobile phone, laptop, PDA, etc. In embodiments, user device 110 supports multiple RATs (e.g., CDMA, GSM and/or WLAN). When user device 110 travels between coverage areas, a handover occurs. During a handover (also referred to as a handoff), a wireless device changes its primary association from the current serving network access device (e.g., base station or access point) to another network access device. A handover may be triggered by a variety of factors such as a decrease in link quality or network loading. When user device 110 travels between coverage areas using the same RAT, a horizontal handover occurs. When user device 110 travels between coverage areas between networks using different RATs (e.g., Network A and Network B), a vertical handover occurs (i.e., RAT changed).

Figure 2:
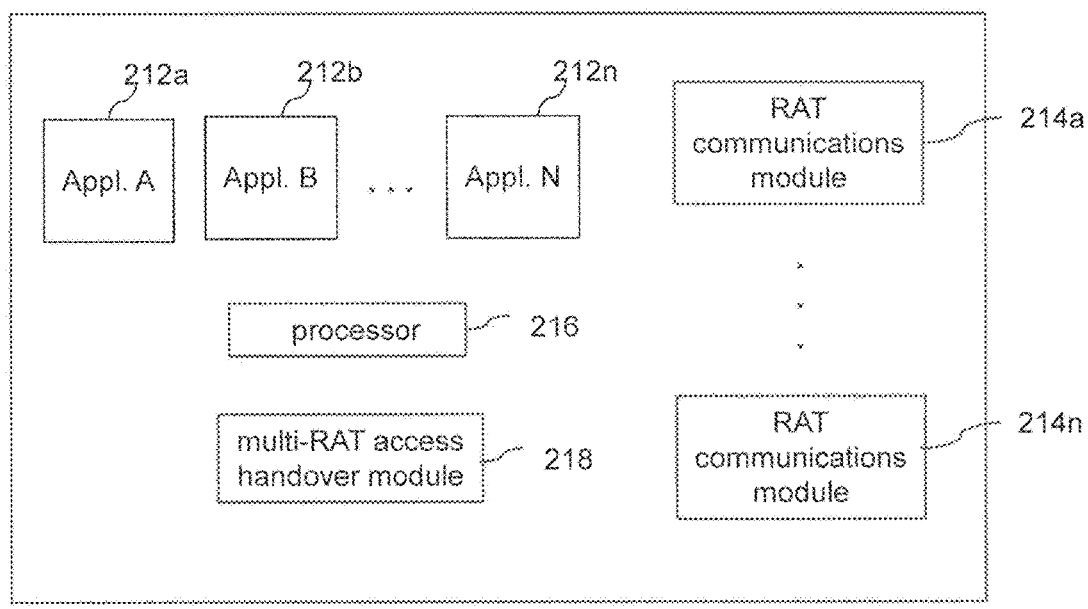
FIG. 2 depicts an exemplary user device, according to embodiments of the present disclosure.

FIG. 2 depicts an exemplary user device 210, according to embodiments of the present disclosure. User device 210 is a multi-RAT device. Therefore, user device 210 includes at least two RAT communications modules 214. Each RAT module 214 is configured to support a specific radio access technology. For example, RAT module 214a may support a cellular protocol such as CDMA, OFDMA, or GSM and RAT module 214n may support a data network protocol such as 802.11.

User device 210 further includes a processor 216 configured to execute one or more applications 212. Applications 212 may include, for example, e-mail, a video player, an audio player, games, etc. User device 210 also include multi-RAT access handover module 218. In an embodiment, multi-RAT access handover module 218 is configured to generate performance metrics associated with the device and/or applications running on the device and report these metrics to the network. For example, the multi-RAT access handover module 218 may periodically send reports to the multi-RAT controller 180 via one of its RAT modules 214. In an alternate embodiment, multi-RAT access handover module 218 is configured to make a determination of whether to accept the handover request from the network or initiate a handover request. For example, user device 210 may store a history that indicates a predicted upcoming need for heavy usage beyond the capability of a soon to be available AP and avoid a handover to that AP.

Returning to FIG. 1, operating environment 100 further includes a multi-RAT controller 180. Multi-RAT controller 180 is coupled to one or more components in Network A, one or more components in Network B, and one or more components in Network C. In an embodiment, multi-RAT controller 180 is configured to optimize access and handover decisions in a multi-RAT operating environment such as the environment of FIG. 1. In a further embodiment, multi-RAT controller 180 is configured to predict a future need for handovers and to make preparation for the predicted handovers. Although illustrated as a centralized controller, in embodiments, multi-RAT controller 180 can be distributed or cloned in one or more networks.

Figure 3A:
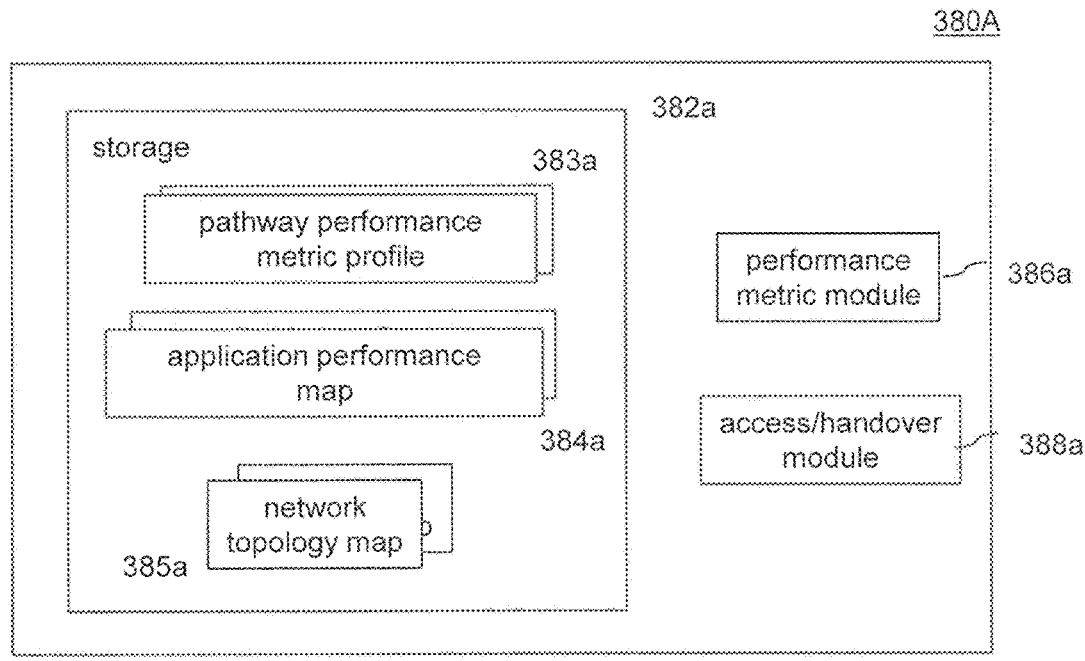
FIG. 3A depicts a multi-RAT controller for optimizing access and handover decisions, according to embodiments of the present disclosure.

FIG. 3A depicts a multi-RAT controller 380A for optimizing access and handover decisions, according to embodiments of the present disclosure. Multi-RAT controller 380A includes storage 382A and a performance metric module 386A and a multi-RAT access and handover module 388A. Performance metric module 386A is configured to receive network performance metrics for an application from user devices 110 and network nodes. Performance metric module 386A is further configured to compile these metrics into historical application profiles and/or to generate a performance map for each application. Performance metric module 386 may access a network topology map when compiling the application profile and/or generating the performance map. An exemplary operation performed by performance metric module 186 is described in FIG. 5 below.

The performance metrics may include communication performance indicia or any other type of information regarding the operation of any node in a network. The performance metrics may indicate observed network latency, network stability information, a number of connected users, Q-depth, RF environment information such as a number of communication channels, frequency, bandwidth, error rates, network loading information, quality of service (QoS) information, a node address and/or identification, security information, date and/or time of day, and/or operational information above one or more network access devices such as battery life and/or operational status.

Performance metrics may include any of the aforementioned metrics specific to a particular pathway between a user device and a destination element (e.g., server). A network element (e.g., node) may include functionality to monitor and/or measure performance metrics and send these performance metrics to the multi RAT controller.

Multi-RAT access and handover module 388A is configured to determine the optimal handover path for a device running an application, according to embodiments of the present disclosure. An exemplary operation performed by multi-RAT access and handover module 388A is described in FIG. 6 below.

Storage 382A is configured to store historical profiles for one or more user applications (pathway performance metrics profile) 383A and an optional performance map 384A for each application. In addition, storage 382A may include a topology map 385A for one or more networks served by multi-RAT controller 380A. Topology map 385A may include a listing of network elements present in the network and the interconnection options for the network elements.

FIG. 4 depicts an exemplary pathway performance metrics profile 483 for one or more applications, according to embodiments of the present disclosure. Pathway performance metrics profile 483 may include pathway metrics for multiple applications. As illustrated in FIG. 4, for an application, metrics for an application are compiled for network nodes in a path. These metrics can then be used to generate a performance map for each application.

In embodiments, a network operator may use the pathway performance metrics profile 483 to indicate whether a network node requires upgrading or replacement. For example, a network operator may upgrade a network node that is frequently used for high bandwidth applications for given performance metric criteria.

Figure 5:
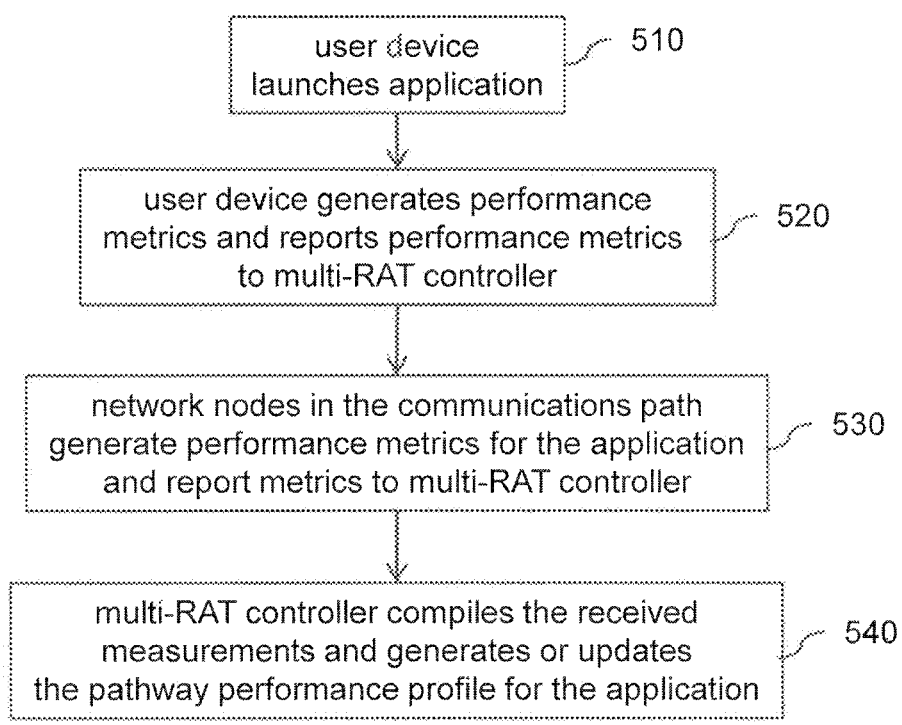
FIG. 5 depicts a flowchart of a method for generating performance metrics for a user device application, according to embodiments of the present disclosure.

FIG. 5 depicts a flowchart 500 of a method for generating performance metrics for a user device application, according to embodiments of the present disclosure. Flowchart 500 is described with reference to FIGS. 1, 2 and 3A. However, flowchart 300 is not limited to those embodiments.

In step 510, the user device launches and runs an application. The application communicates with a terminating device such as a server while running the application. For example, user device 120 may launch and run a video streaming application having content stored on a network server.

In step 520, the user device generates performance metrics for the application and reports these metrics to the multi-RAT controller 180. For example, the report may be sent through a network access point to the multi-RAT access and handover controller.

In step 530, each node in the communications path generates performance metrics for the application and reports these metrics to the multi-RAT controller.

In step 540, the multi-RAT controller compiles the received measurements and generates or updates the pathway performance profile for the application. Over time, a geography mapped interface plus time map can be generated for the application.

Figure 6:
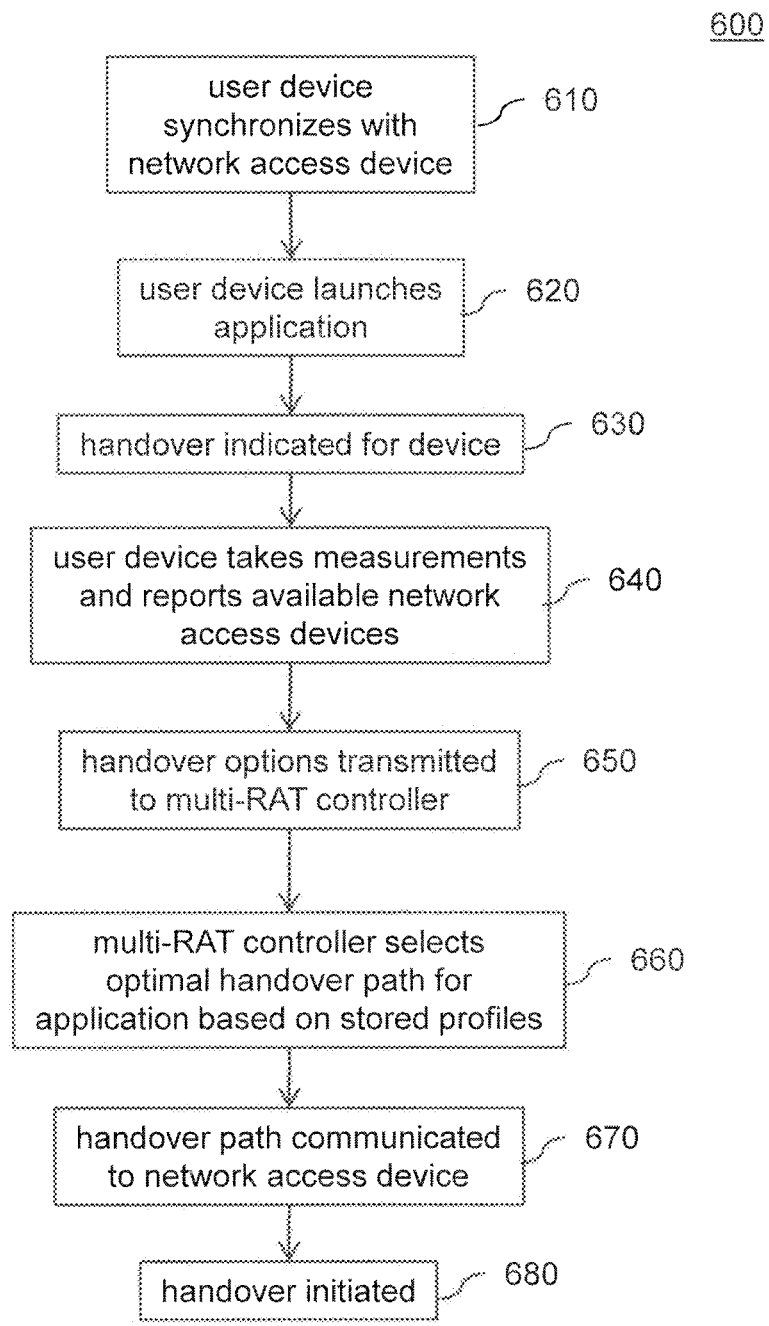
FIG. 6 depicts a flowchart of a method for generating performance metrics for a user device application, according to embodiments of the present disclosure.

FIG. 6 depicts a flowchart 600 of a method for generating performance metrics for a user device application, according to embodiments of the present disclosure. Flowchart 600 is described with reference to FIGS. 1, 2 and 3A. However, flowchart 600 is not limited to those embodiments.

In step 610, user device 110 synchronizes with a network access device such as a base station 122 or access point 162.

In step 620, user device 110 launches an application 212. During operation, application 212 accesses a network device such as a server.

In step 630, a handover is indicated for user device 110. For example, if user device 110 is moving, user device 110 may leave the coverage area of one network access device and enter the coverage area of one or more network access devices.

In step 640, user device 110 takes measurements and reports available network access devices. For example, user device 110 may perform a scan and identify a set of access points available for handover.

In step 650, the identified handover options are transmitted to multi-RAT controller 180. In embodiments, additional information may also be provided to multi-RAT controller such as an identification of the application, identification of any streams associated with the application, and/or performance metrics associated with the current connection. For example, the receiving network may forward the identified handover options and information regarding the application being used by the user device to the multi-RAT controller.

In step 660, multi-RAT controller 180 selects the optimal handover path for the application running on user device 110 based on the stored profiles. For example, multi-RAT controller 180 may access the network performance map for the application. Using the map, the multi-RAT controller identifies the path and/or network nodes that have historically provided the best performance for the application. If user device 110 is running multiple applications, multi-RAT controller 180 may access the network map for both applications and select a path that provides the optimal performance for both applications. In alternate embodiments, multi-RAT controller 180 uses the pathway performance profile for an application when selecting the optimal handover path.

In step 670, the handover path is communicated to the network access device currently serving user device 110. The handover path indicates the network access device (e.g., an access point) to handover the connection.

In step 680, a handover to the network access device in the handover path is initiated.

Figure 7:
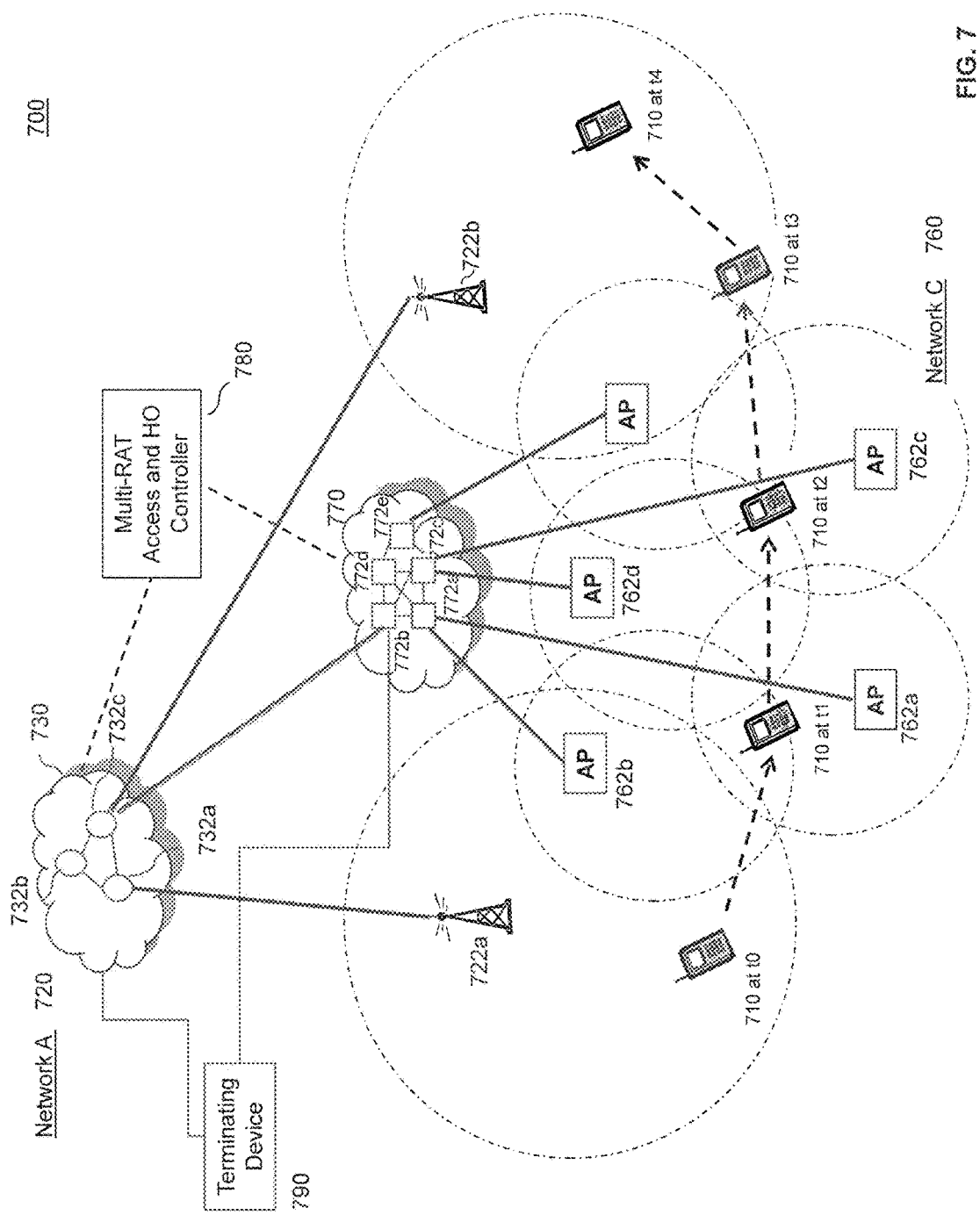
FIG. 7 depicts a further operating environment for predicting the need for a future handover, according to embodiments of the present disclosure.

FIG. 7 depicts a further operating environment 700 for predicting the need for a future handover, according to embodiments of the present disclosure. FIG. 7 depicts a predicted travel path for a user device 710 over a specified time period ($t_0$ to $t_4$). As described further below, the predicted travel path may be estimated using historical travel patterns for user device.

In an embodiment, user device 710 is running an application that requires connection to device 790 (referred to as a "terminating device"). Device 790 may be a server, another network node, or an end user device. User device 710 may be connected to device 790 via a number of paths during the time period ($t_0$ to $t_4$). For example, path A may be through base station 712*a* and switch 732*b* to device 790. Path B may be through AP 762*a* through routers 768*a* and 768*b* to device 790. Path C may be through AP 762*b* through routers 768*a* and 768*b* to device 790. Additional paths can be formed through AP 762*c*, AP 762*d*, AP 762*e* and base station 722*b*. As would be appreciated by persons of skill in the art, various routing or switching paths can be used in each core network 730, 770.

In an embodiment, multi-RAT controller 780 of FIG. 7 is configured to predict optimal handovers for user device 710 during the prediction time period $t_0$ to $t_4$. The handover prediction may be based on a number of factors including user mobility, device or application need for signaling, historical performance of available paths, and data associated with other users or applications having similar attributes as the user. Once future handovers are predicted, multi-RAT controller 780 is configured to make preparation for those handovers by communicating information to the potential service access devices (e.g., AP 162*c*, AP 162*e*, etc.)

Figure 3B:
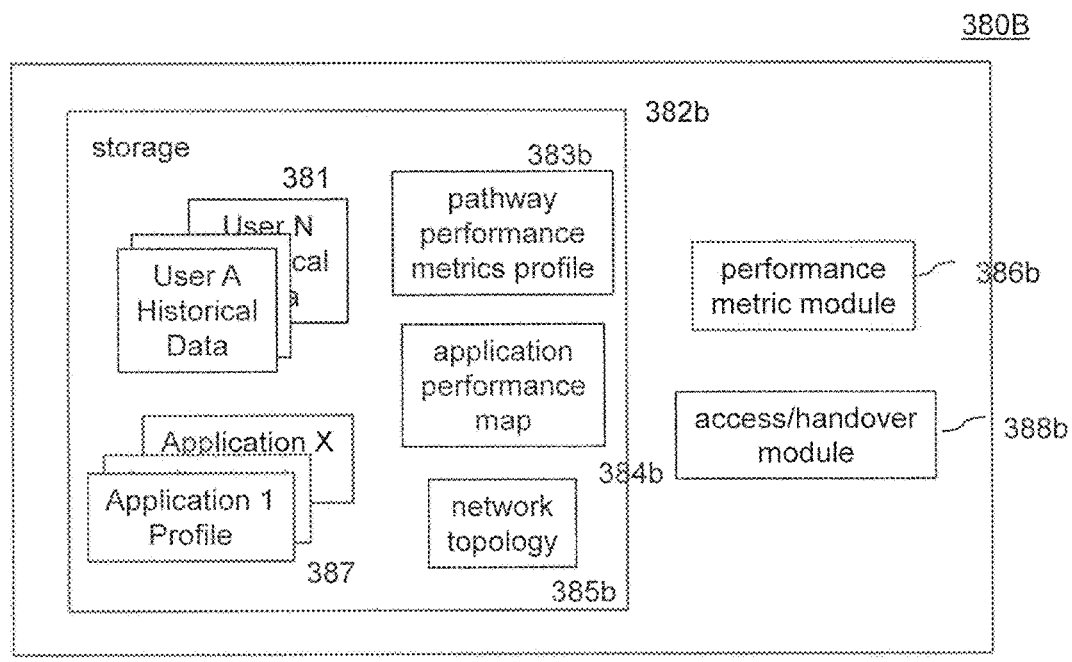
FIG. 3B depicts a multi-RAT controller for predicting the need for further handovers and preparing for predicted handovers, according to embodiments of the present disclosure.

FIG. 3B depicts a multi-RAT controller 380B for optimizing access and handover decisions, according to embodiments of the present disclosure. Multi-RAT controller 380B includes storage 382B, performance metric module 386B and multi-RAT access and handover module 388B. Performance metric module 386B was described above in relation to FIG. 3A and FIG. 5.

Multi-RAT access and handover module 388B is configured to predict a future need to handover a communication connection using historical user data, application profiles, and historical network performance metrics for the application. In addition, multi-RAT access and handover module 388B is further configured to prepare for the predicted handovers in advance of a handover event. Exemplary operation of multi-RAT access and handover module 388 is described in further detail in FIG. 8 below.

Storage 382B includes user historical data 381, application profiles 387, pathway performance metrics profiles 838B, application performance maps 384B, and network topology maps 835B. Pathway performance metric profiles 838B, application performance maps 384B, and network topology maps 835B were described above with reference to FIG. 3A.

User device profile 381 may include historical travel patterns for the user device, usage patterns for the user device, and optionally an identification of a user device affinity group. The historical travel patterns reflect the movement of the user device. The historical travel patterns can be used to identify network access points such as APs, base stations, or eNBs that are likely accessible to the user device during the specific time period of the prediction.

The usage patterns for the user device may track the applications used by the user device (e.g., e-mail, video, audio, or games) and time periods that each application is likely to be used. An affinity group for the user device includes an identification of user devices having similarities with user a device. The affinity group may be generated a priori based on travel and usage patterns for a user device. Alternatively, the affinity group may be generated in real-time.

Figure 8:
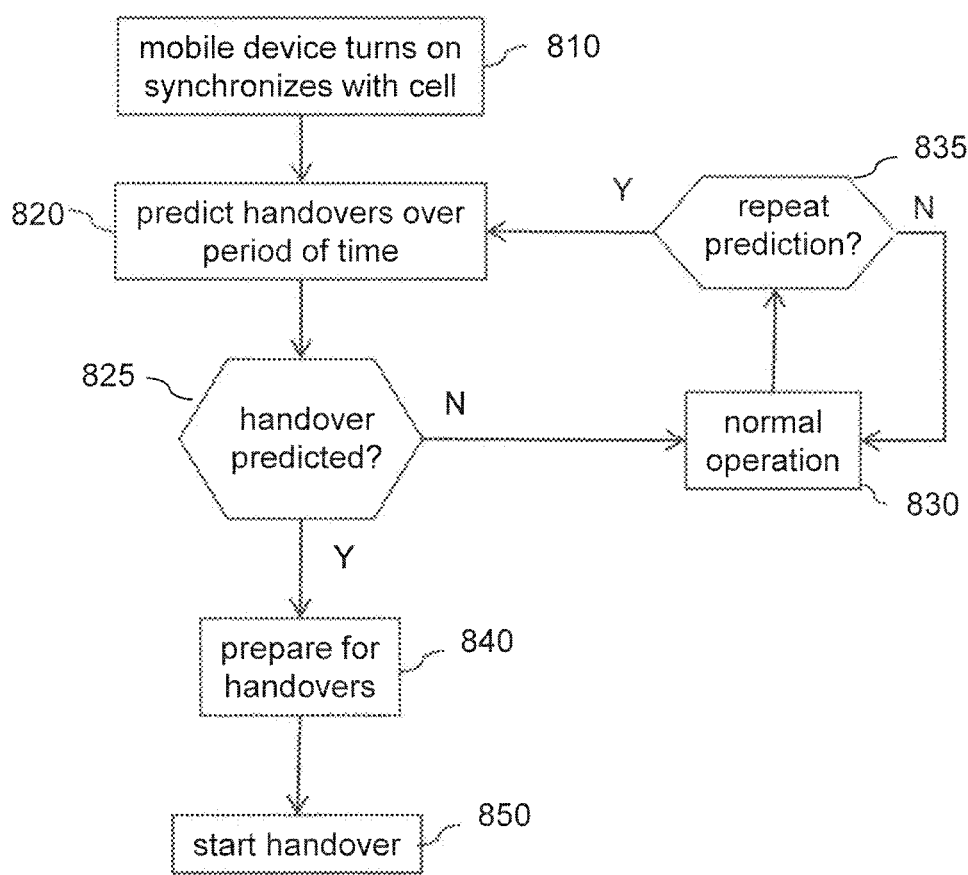
FIG. 8 depicts a flowchart for a method of predicting the need for a future handover and preparing for future handovers, according to embodiments of the present disclosure.

FIG. 8 depicts a flowchart 800 for a method of predicting the need for a future handover and preparing for future handovers, according to embodiments of the present disclosure. Flowchart 800 is described with continued reference to FIGS. 7 and 3B. However, flowchart 800 is not limited to those embodiments.

In step 810, user device 710 turns on and synchronizes with a base station such as base station 722a.

In step 820, multi-RAT access and handover controller 780 predicts the need for handovers over a specific period of time (e.g., 30 minutes). During the prediction process, the multi-RAT access and handover controller 380 may take into consideration various factors and/or approaches for determining the need for a handover including user mobility, device or application need for signaling, historical performance of available paths, and data associated with other users or applications having similar attributes as the user.

To perform the handover prediction, multi-RAT access and handover controller 780 may access a profile for the user device 710. The user device profile 381 may include historical travel patterns for the user device, usage patterns for the user device, and in embodiments, an identification of a user device affinity group. The historical travel patterns reflect the movement of the user device. For example, the historical travel pattern may show that on weekdays from 7 am to 8 am, a 90% probability exists that the user device will follow a specific path (e.g., user commutes to work every morning using the same route) and on weekdays from 6 pm to 7 pm, a 90% probability exists that the user device will follow a specific path (e.g., user returns home following work using the same route). The historical travel patterns can be used to identify network access points such as APs, base stations, or eNBs that are likely accessible to user device 710 during the specific time period of the prediction.

In addition, the usage patterns for the user device may track the applications used by the user device (e.g., e-mail, video, audio, or games) and time periods that each application is likely to be used. For example, user device 780 may be more likely to use an e-mail application from 7 am-9 am and a video game application for 6 pm to 7 pm. Multi-RAT controller 780 may use these usage patterns to determine the application that the user device is most likely to use during the time period of the prediction. Knowing the type of application and associated data traffic can assist multi-RAT controller 780 to select the optimal paths for the communication during the time period and in turn the handovers necessary to achieve these optimal paths.

Multi-RAT controller 780 may further include indication of an affinity group for the user device. The affinity group for the user device includes an identification of user devices having similarities with user device 780. The affinity group may be generated a priori based on travel and usage patterns for a user device. Alternatively, the affinity group may be generated in real-time. In embodiments, multi-RAT controller 780 may access profiles associated with user devices in user device 780's affinity group. Multi-RAT controller 780 can then use this information to predict potential applications that user device 780 may access during the time period for the prediction.

After applications likely to be used by the user device are identified, profiles associated with these applications may be accessed by the multi-RAT access and handover controller 780. The application profile may indicate the signaling and/or data usage needs for the application. This data may also be used as a factor in selecting the optimal path for communications during the time period of the prediction.

Finally, multi-RAT controller 780 may access historical performance of potential paths identified for user device communication during the time period of the prediction. For each application, performance criteria for the application may be provided for the path, as a whole, and/or for each node (including the AP) in the path. In embodiments, the data may further be broken down per user device. Using this data, multi-RAT access and handover controller 780 identifies the paths and associated handovers necessary during the time period of the prediction.

In step 825, a determination is made whether a handover is predicted during the time period. If one or more handovers are predicted, the operation proceeds to step 840. If no handovers are predicted operation proceeds to step 830.

In step 830, normal operation occurs.

In step 835, a determination is made whether the prediction process should be repeated for a different time period. If the prediction process is to be repeated, operation returns to step 820. If the prediction process is not to be predicted, operation returns to step 830. Step 835 may be repeated periodically.

In step 840, multi-RAT controller 780 prepares for the identified handovers. If a handover prediction is made, a reservation process begins where details regarding the anticipated communications flow needs, collected as part of the prediction process of step 820, is used to lock-in resources before handover event occurs. The advance preparation may further include delivering communication information and characteristics to be used over the time period to all pathway nodes include the user device, APs and other AP/routers.

In step 850, a handover process is initiated. In an embodiment, the serving base station instructs the user device to take measurements. For example, the user device may suspend communication with base station. The user device may then switch to receive signals using another RAT module. If the RAT is a cellular protocol, the user device acquires a pilot, synchronizes with the cell and takes measurements. If the RAT is 802.11, the user device scans for beacon messages sent out by APs and generates a list of APs and their associated measurements. The user device then sends the measurements to its serving base station. The user device may switch to each available RAT module to take measurements. If the AP predicted for the handover is on the list found by the user device, serving base station may then instruct the user device to initiate a handover to the AP identified in step 830. In an alternate embodiment, the base station instructs the user device to the AP identified for handover without taking measurements.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A multi radio access technology (RAT) controller coupled to a plurality of core networks that service a plurality of user equipment (UEs) and access points (APs), comprising:
    a memory; and
    a processor, coupled to the memory, configured to:
        receive a first and second pathway performance metric corresponding to communications between a first UE, from among the plurality of UEs, and a first and second core network, respectively, from among the plurality of core networks, the first and second pathway performance metrics being associated with a user application that is launched and run on the first UE, wherein the first pathway performance metric comprises a number of communication channels;
        generate a performance profile for the user application using the first and second pathway performance metrics
        update the performance profile for the user application using a third pathway performance metric associated with the user application running on a second UE from among the plurality of UEs; and
        after the performance profile is updated using the third pathway performance metric, cause the first UE to be serviced by the first or the second core network based on the performance profile.

2. The multi RAT controller of claim 1, wherein the processor is further configured to receive a plurality of pathway performance metrics corresponding to communications between the first UE and the first and second core networks via a plurality of communication pathways.

3. The multi RAT controller of claim 2, wherein the processor is further configured to cause the first UE to communicate with the first or second core network via a communication pathway from among the plurality of communication pathways based on which pathway performance metric from among the plurality of pathway performance metrics indicates better communications performance.

4. The multi RAT controller of claim 2, wherein the plurality of communication pathways include communication pathways between the first UE and the first core network via a plurality of respective access points (APs) utilizing a Wi-Fi protocol.

5. The multi RAT controller of claim 2, wherein the plurality of communication pathways include communication pathways between the first UE and the second core network via a plurality of respective evolved-node Bs (eNBs) utilizing a long term evolution (LTE) protocol.

6. The multi RAT controller of claim 1, wherein the processor is further configured to evaluate which of the first or second pathway performance metrics indicate better communication performance utilizing a cost function.

7. The multi RAT controller of claim 1, wherein the memory stores historical data representative of performance metrics associated with the user application of the first UE.

8. The multi RAT controller of claim 7, wherein the processor is further configured to cause the first UE to be serviced by the first or the second core network based on a combination of:
    which of the first or second pathway performance metric indicates better communications performance; and
    the historical data.

9. A user equipment (UE), comprising:
    a memory; and
    a processor configured to:
        measure performance metrics for a user application of the UE, the performance metrics corresponding to communications between the UE and a plurality of network members associated with a plurality of radio access technologies (RATs), wherein the performance metrics comprise a number of communication channels;
        send the performance metrics to a central management node to update a performance profile for the user application that was generated based on a third pathway performance metric associated with the user application running on another UE, wherein the performance profile separately tracks pathway performance metrics for each of a plurality of user applications of the UE; and
        select a network member from among the plurality of network members for utilization of network services to support the user application based on a communication from the central management node determined based on the performance profile.

10. The UE of claim 9, wherein the performance metrics include performance metrics associated with past communications.

11. The UE of claim 9, wherein the processor is further configured to send the performance metrics to the central management node via a RAT module from among a plurality of RAT modules of the UE.

12. The UE of claim 10, wherein the processor is further configured to send an application profile for the user application to the central management node.

13. The UE of claim 12, wherein the communication is received from the central management node via a RAT module from among a plurality of RAT modules of the UE.

14. The UE of claim 9, wherein the performance metrics include one or more of:
    network latency;
    available base stations within range of the UE;

available access points within range of the UE;
a number of connected users;
a number of communication channels;
communication frequency;
communication bandwidth;
an error rate; or
a network load.

15. A multi radio access technology (RAT) controller coupled to a plurality of core networks that service a plurality of user equipment (UEs) and access points (APs), comprising:
    a memory; and
    a processor, coupled to the memory, configured to:
        receive a first and second pathway performance metric corresponding to communications between a UE, from among the plurality of UEs, and a first and second core network, respectively, from among the plurality of core networks, the first and second pathway performance metrics being associated with a user application among a plurality of user applications of the UE, wherein the first pathway performance metric comprises a number of communication channels;
        update a performance profile for the user application using the first and second pathway performance metrics and a third pathway performance metric associated with the user application running on another UE, wherein the performance profile separately tracks pathway performance metrics for each of the plurality of user applications of the UE; and
        cause the UE to be serviced by the first or the second core network based on the performance profile and which of the plurality of user applications of the UE is running on the UE.

16. The multi RAT controller of claim 15, wherein the processor is further configured to receive a plurality of pathway performance metrics corresponding to communications between the UE and the first and second core networks via a plurality of communication pathways.

17. The multi RAT controller of claim 16, wherein the processor is further configured to cause the UE to communicate with the first or second core network via a communication pathway from among the plurality of communication pathways based on which pathway performance metric from among the plurality of pathway performance metrics indicates better communications performance.

18. The multi RAT controller of claim 16, wherein the plurality of communication pathways include communication pathways between the UE and the first core network via a plurality of respective access points (APs) utilizing a Wi-Fi protocol.

19. The multi RAT controller of claim 16, wherein the plurality of communication pathways include communication pathways between the UE and the second core network via a plurality of respective evolved-node Bs (eNBs) utilizing a long term evolution (LTE) protocol.

20. The multi RAT controller of claim 15, wherein the processor is further configured to evaluate which of the first or second pathway performance metrics indicate better communication performance utilizing a cost function.

* * * * *